Aug. 12, 1958　　H. E. MENSER ET AL　　2,847,204
PIPE MITERING MACHINE

Filed July 12, 1955　　　　　　　　　　　3 Sheets-Sheet 1

Henry E. Menser
Roy L. Jeffords
Cyrus O. Vancil
　　　　INVENTORS.

BY

Aug. 12, 1958  H. E. MENSER ET AL  2,847,204
PIPE MITERING MACHINE
Filed July 12, 1955  3 Sheets-Sheet 2

Henry E. Menser
Roy L. Jeffords
Cyrus O. Vancil
INVENTORS.

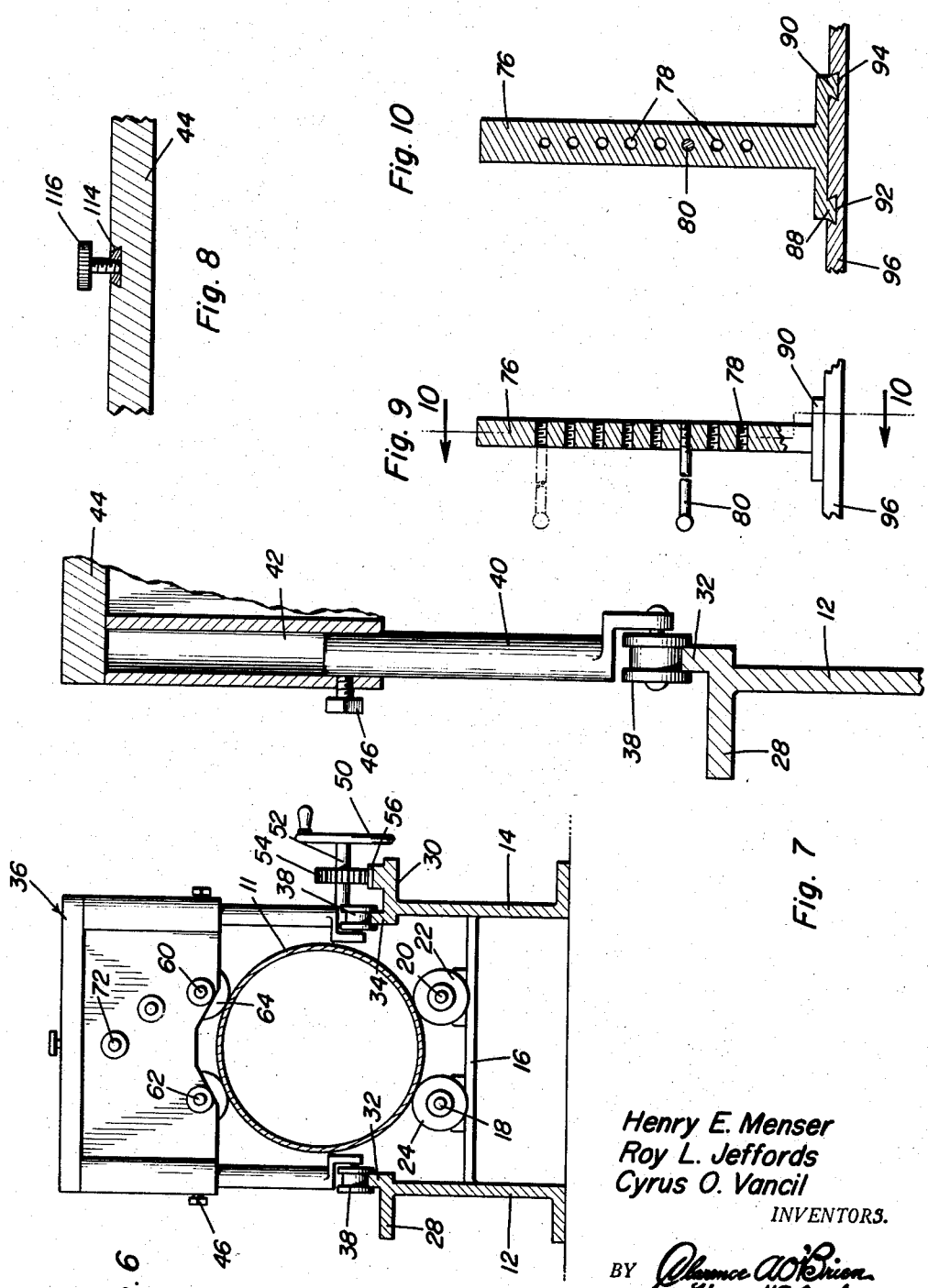

United States Patent Office 2,847,204
Patented Aug. 12, 1958

2,847,204

PIPE MITERING MACHINE

Henry E. Menser, Roy L. Jeffords, and Cyrus O. Vancil, Paducah, Ky.

Application July 12, 1955, Serial No. 521,460

2 Claims. (Cl. 266—23)

This invention relates to pipe mitering machines and particularly to a blow pipe machine constructed and arranged to miter pipe at any degree from zero to forty-five accurately and neatly.

A considerable amount of mitering steel pipe is done by hand at the present time. This requires laying out of pipe preparatory to fabrication and in order to have a neat joint, an extremely high degree of skill on the part of the person utilizing the blow pipe in the cutting operations. Earlier pipe mitering machines are quite complex in construction and adjustment and therefore have not been completely acceptable. Accordingly, it is an object of the present invention to provide a pipe mitering machine which is very accurate, and yet, which is of very simple construction.

A more specific object of this invention is to provide a mitering machine which utilizes a bed of live rollers to accommodate the work-piece which work-piece is arranged to actuate a motion transmitting assembly, ultimately to reciprocate a blow pipe support operatively adjacent to the pipe in unison and coordination with the rotation of the pipe.

Another specific object of this invention is to provide a pipe mitering machine of the type which revolves the pipe to be cut, with a carriage having a locking device to hold it in the selected, adjusted position, with respect to the pipe all during the pipe mitering operation. In this way accuracy of the miter cut is assured.

Other objects and features of importance will become apparent in following the description of the illustrated form of the invention.

In the drawings:

Figure 6 is a transverse sectional view showing the mitering machine being used with a rather large diameter pipe and illustrating the capability of the machine to adjust to different pipe diameters;

Figure 7 is an enlarged fragmentary detail showing the adjustment means for the carriage height on its supporting structure;

Figure 8 is an enlarged detailed sectional view taken on the line 8—8 of Figure 2 showing a pointer which coacts with one or more markings provided on a part of the blow pipe support reciprocating means so that the blow pipe center line is easily determined;

Figure 1:
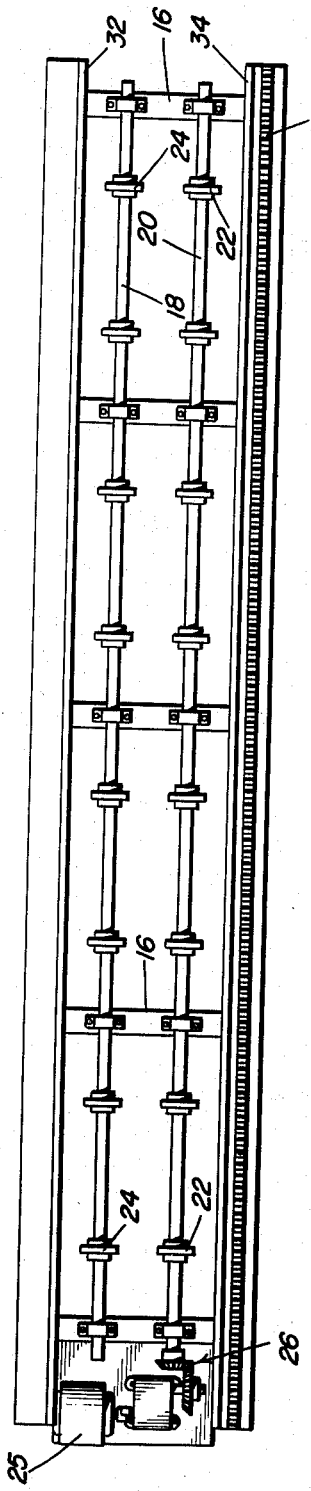
Figure 1 is a plan view of the bed of live rollers and stand on which the carriage portion of the invention is to be mounted.
Figure 2:
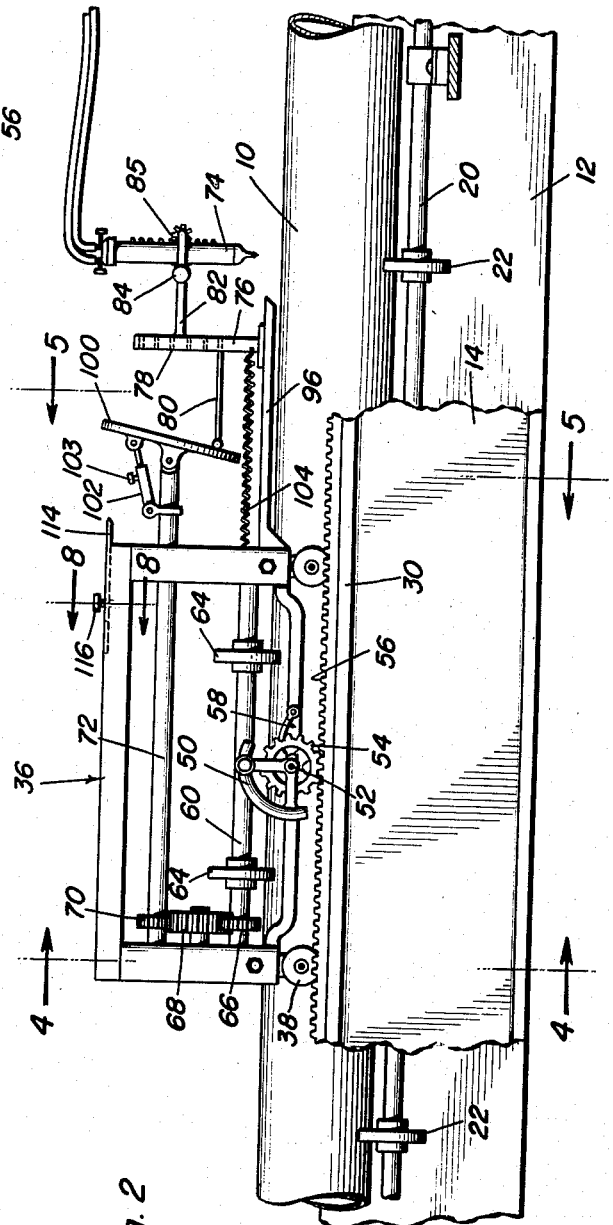
Figure 2 is a fragmentary side view of the mitering machine, portions being broken away in section.

Figure 9 is an elevational view, part shown in section, of a blow pipe supporting member and cam follower constituting a part of the drive means to reciprocate the blow pipe; and Figure 10 is a sectional view taken on the line 10—10 of Figure 9 showing particularly the dove-tail connection of the carriage and blow pipe support means which restricts and limits movement thereof to rectilinear in a plane extending longitudinally of the pipe which is carried on the live roller bed.

The pipe mitering machine which embodies the principles of this invention uses a bed of live rollers in a support structure so that pipe 10 may be both supported and rotated for the mitering operations. The support structure preferably consists of a pair of channels 12 and 14 arranged parallel to each other and held in that relationship by a sufficient number of cross members 16 which may be welded or otherwise fixed in place on the webs of the channels. A pair of shafts 18 and 20 respectively are arranged along side of each other and are spaced apart enough to form supports for their rollers 22 and 24 that hold pipe 10 for rotation. One of the shafts is driven by a motor 25 through gear box and gearing 26. Although other drives may be employed, the illustrated means for rotating the shaft 20 typifies the preferred form of drive.

Figures 3, 4, 5:
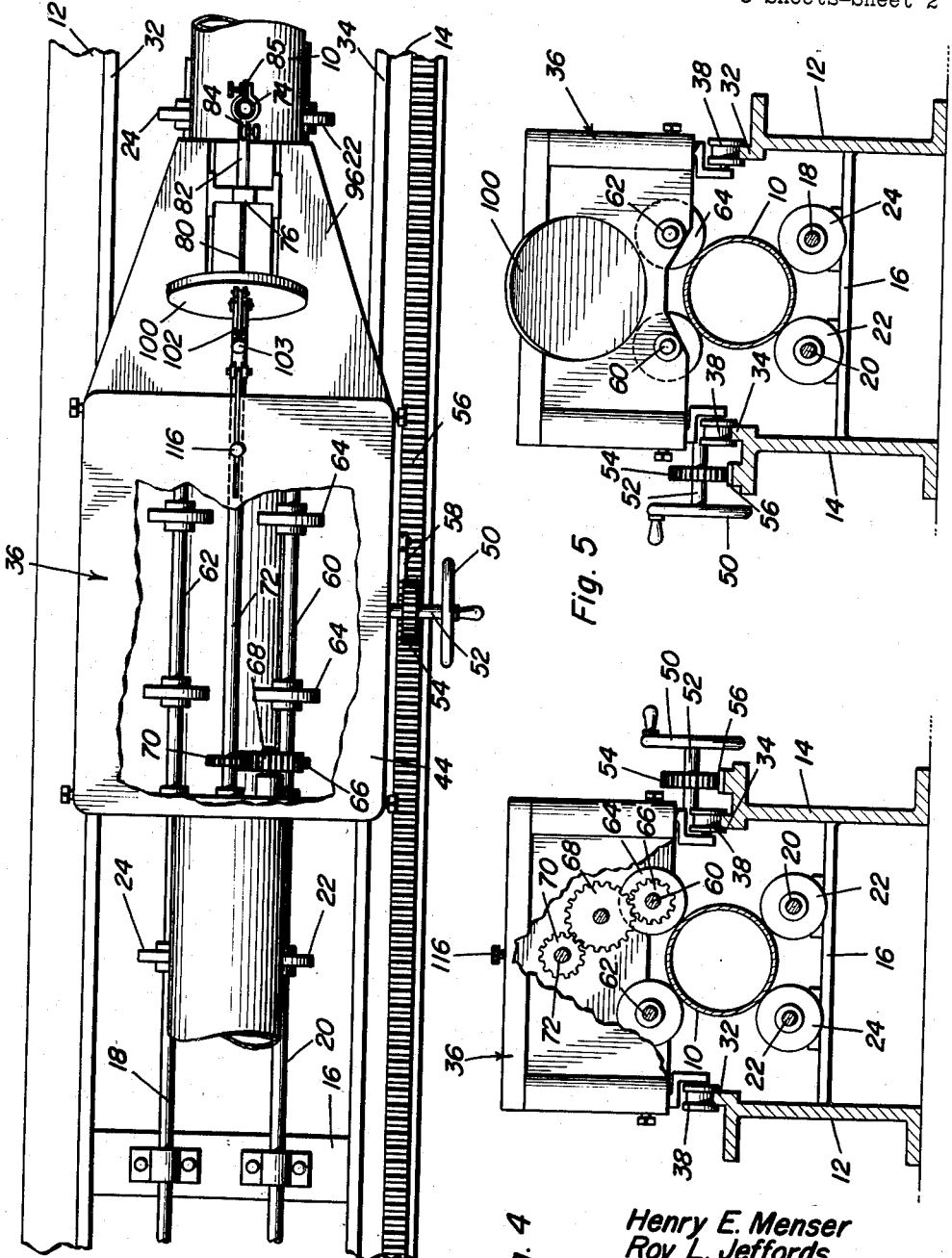
Figure 3 is a top view of the structure of Figure 2.
Figure 4 is a transverse sectional view taken on line 4—4 of Figure 2.
Figure 5 is a transverse sectional view taken on the line 5—5 of Figure 2.

The upper flanges 28 and 30 of channels 12 and 14 have upstanding rails on which carriage 36 is mounted. The carriage has four wheels 38 on it, and each wheel has a pair of flanges which ride on the sides of the rails in order to hold the carriage 36 against lateral movement. Each wheel 38 is carried by a post 40 (Figure 7) which is telescopingly accepted by a tube 42, the latter forming part of carriage 36 and connected to the carriage top 44 and side supports and end plate thereof. Means releasably holding post 40 in adjustable position are provided for each wheel 38 supporting assembly, one type of locking means being a simple setscrew, as at 46. The purpose of having the carriage vertically adjustable is to accommodate different diameter pipes, for example, the pipe 10 of Figure 5 or the pipe 11 of Figure 6.

In the use of the pipe mitering machine it is suggested that the carriage be moved to one end of the support structure and the pipe laid in place on the rollers 22 and rollers 24. In order to move the carriage, the wheel 50 which is mounted for rotation by shaft 52 in carriage 36, is actuated thereby rotating the gear 54 which engages rack 56. Pinion 54 is fixed to the shaft 52 while rack 56 is fixed to flange 30. In this way rotation of the hand wheel 50 will cause the carriage to move in either direction on the support structure. A locking device, for example dog 58, is used to fix the carriage in place after it has been positioned. This dog engages the teeth of gear 54 and is but one of a variety of locking devices which may be selected for holding the carriage.

The carriage 36 is equipped with a pair of parallel shafts 60 and 42, each shaft having at least one but perferably two or more rollers 64 secured to it. These rollers contact the pipe and are driven by it. The shafts 60 has a gear 66 secured to it which meshes with an idler 68, the latter engaging the gear 70 The latter gear is fixed to a shaft 72 carried in suitable bearings by carriage 36 whereby the shaft 72 is rotated in response to rotation of pipe 10.

A blow pipe 74 is used to perform the actual cutting operation. It is carried by a blow pipe supporting member, as the standard 76. This standard (see Figures 9 and 10) has a vertical row of threaded apertures 78 in it constituting means to accept cam follower 80 and hold it in different selected positions. An arm 82 protrudes from standard 76 and pivotally supports the blow pipe 74. A pivot clamp 84 is secured to arm 82 and vertical adjusting means 85 of blow pipe 74 in order to hold the blow pipe in a selected position for pivotal and vertical adjustment whereby various angles cut may be preselected and held.

Means for supporting the blow pipe 74 so that it is capable of rectilinear movement constrained in a plane extending longitudinally of the pipe are in part made up by the standard 76. In addition, the lower end of standard 76 is fashioned with feet 88 and 90 operable in ways 92 and 94 that are formed in a forwardly protruding platform 96 which constitutes a part of the carriage 36. Cam 100 is used to impart rectilinear movement to the standard 76 and hence blow pipe 74. This cam is fastened to the outer end of shaft 72 for pivotal movement and is held in a fixed pivoted position by means of extensible linkage 102. Spring 104 secured to a structural part of carriage 96 and standard 76 opposes the movement of standard 76 in one direction while it constantly maintains cam follower 80 firmly pressed against one face of cam 100.

In operation the carriage 36 is moved to one end of the support structure by rotation of hand wheel 50. Then the pipe is placed on its bed of rollers and hand wheel 50 is again rotated until carriage 36 is located in proper position for the length of pipe desired to be cut. The carriage 36 is then locked in place by the locking device provided, as at 58. Now, if the carriage is too high so that rollers 64 fail to contact pipe 10, it is lowered by retracting the adjustable legs (Figure 7). Cam follower 80 is then placed in the correct opening 78 as required by the outside diameter of the pipe 10 which is to be cut. Inasmuch as the row of openings are vertically arranged, cam follower 80 is moved closer or farther from the axis of rotation of cam 100 thereby determining the extent of travel of standard 76 which in turn, is necessitated in view of the various diameter pipes 10 or 11 which may be cut.

Next, the blow pipe 74 is set for bevel or square cut. This is done by adjusting the extensible linkage 102 so that the blow pipe 74 is at the desired angular relationship to a vertical plane passing through the axis of rotation of pipe 10. Cam 100 which functions as a template is now angularly set, using a protractor in order that the proper angle of cut is obtained. Thumb screw 103 is used for locking the cam 100 in the desired position. Spring 104 if not previously fastened in place may now be attached in order to hold the cam follower 80 tightly pressed against the face of cam 100. The back face of cam 100 has a marking on it (Figure 3) which is used with pointer 114 carried on the top 44 of carriage 36. This pointer is held in place by setscrew 116 and is movable toward the cam 100 so that the marking on it may be set accurately in reference to the center line thereof. In this way proper adjustment of cam 100 about its pivotal axis is facilitated.

The motor 25 is energized by actuation of a switch thereby causing the pipe on the supporting structure to rotate through the action of the live rolls. In turn, the shaft 72 is rotated through the gear train on carriage 36 and rollers 64 which contact pipe 10. It is recommended that the pipe be heated first by flame from the blow pipe and then oxygen supplied thereto. While oxygen is being supplied the mitering cut is made inasmuch as cam 100 imparts rectilinear movement to the standard 76 in synchronism with the rotation of pipe 10. The spring 104 returns the standard 76 since it keeps the cam follower 80 firmly pressed against one face of cam 100 at all times.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. In a pipe mitering machine which includes a support structure having a bed of live rollers on which a pipe is adapted to be mounted and by which the pipe is adapted to be rotated, a carriage mounted on said structure for movement longitudinally of the pipe, means connected with the carriage for traversing the same on said support, a locking device operatively connected with the last mentioned means to hold said carriage in a selected position, means to support a blow pipe for pivotal adjustment about an axis transverse to the pipe longitudinal axis to adjust the bevel of the miter cut, a standard for said blow pipe support means, means mounting said standard on said carriage for reciprocatory movement on said carriage in a plane extending longitudinally of the pipe, a shaft in said carriage, means for rotating said shaft in response to pipe rotation, a cam means adjustably securing said cam to said shaft for rotation therewith, a cam follower operable on said cam and secured to said standard longitudinally of said pipe for moving said standard in response to cam rotation, and means to accommodate said cam follower in a plurality of positions with respect to the axis of rotation of the cam for compensating for variations in pipe diameter.

2. The pipe mitering machine of claim 1 and a spring reacting on said standard constanly urging the cam follower carried by the standard against said cam.

References Cited in the file of this patent

UNITED STATES PATENTS

| | | |
|---|---|---|
| 1,858,076 | Douglass | May 10, 1932 |
| 2,334,250 | Cassens et al. | Nov. 16, 1943 |
| 2,389,286 | Watkins | Nov. 20, 1945 |
| 2,495,360 | Young | Jan. 24, 1950 |
| 2,528,147 | Jesonis | Oct. 31, 1950 |
| 2,698,748 | Evans | Jan. 4, 1955 |